Patented Sept. 20, 1927.

1,643,137

UNITED STATES PATENT OFFICE.

HENRY S. SPACKMAN, OF LEHMAN TOWNSHIP, PIKE COUNTY, PENNSYLVANIA.

HYDRAULIC CEMENT AND PROCESS OF MAKING THE SAME.

No Drawing.    Application filed December 17, 1924.   Serial No. 756,623.

The invention relates generally to the manufacture of hydraulic cement but is more especially useful in the manufacture of quick hardening, low lime aluminate cements high in cement forming acid-acting substances, for example alumina, iron oxide, titanium oxide, silica and their homologues. In these cements, the lime or other cement-forming base is present in substantially no greater amount than that required to combine by weight with the cement-forming acid-acting substances in a monocalsic ratio.

Cements of this general character have hitherto been commercially produced by melting the raw materials under conditions in which the iron present is wholly or largely reduced to a metallic state. The furnaces used have usually been water jacketed furnaces of the blast or cupola type or electric furnaces, the material being melted in contact either with fuel or highly incandescent electrodes.

Manufacture by these methods has proved unsatisfactory owing to the high cost of production and lack of uniformity of the product. These unsatisfactory conditions arise out of the presence in the raw material of iron compounds, and the introduction of impurities with the fuel. Iron is found in the raw material in various combinations chiefly oxides, and the result of melting the raw material under reducing conditions is obviously the production of metallic iron and carbides and silicides of iron which have a detrimental effect upon the properties of the finished cement. Not only is it not feasible to grind slag containing substantial quantities of iron in metallic form but its presence is or would be objectionable in the finished product. Efforts are therefore made to eliminate the iron before grinding, these efforts involving a variety of processes such as tapping off separately from the furnace as in iron manufacture, or by magnetic separation, or manual separation or both, after the melt has cooled. None of these methods, however, are wholly successful since in practice complete removal of all of the iron is not effected. The objections to the presence in the finished product of iron in a metallic form, or as a ferrous oxide, arises not only out of the fact it is inert but also by reason of the fact that after the cement has set and hardened internal strains and stresses are set up as a result of oxidation of them in the presence of moisture and air with the consequent increase in volume. The silicides and carbides, however, cannot, so far as known, be eliminated by any mechanical methods, nor by any other commercial or practical methods, and consequently their absence from the finished product is a distinct advantage.

On the other hand if the iron in the slag is present in the form of calcium ferrites and ferrates or other oxide of iron compounds, not only is the necessity for the removal of the iron as a prerequisite to grinding avoided, but its presence in quantities of from 10 to 20% in the finished product is in most cases a distinct advantage, as it apparently aids in regulating the setting time of the cement and increases the impermeability and durability and strength of mortars and concretes made from it.

Another advantage of my process which relates directly to the matter of cost consists in the fact that it is possible to keep the furnace temperature from 100 to 200 degrees centigrade lower than is necessary in any process in which reduction of the iron content to the form of steel is involved. In order that the melted charge may flow freely, it is necessary that the entire melt be kept at a temperature sufficiently high to maintain any steel in a fluid condition. The temperature necessary for this purpose however, is from 100 to 200 degrees centigrade higher than is necessary to keep the slag in fluid condition. The maintenance of these higher temperatures is therefore a distinct economic loss not only contributing nothing to the quality of the product, but being positively detrimental to the furnace lining, and therefore, obviously any method of reducing these temperatures is a distinct advantage.

I have discovered that if the volume of air blast be so proportioned that oxidizing conditions be substituted for the reducing conditions heretofore used in manufacturing melted cement of this character, marked improvement in quality and marked reduction in cost result. While it is practical by properly proportioning the amount of air (preferably pre-heated) fuel and charge, to economically maintain non-reducing conditions in furnaces of the blast or cupola type, these conditions can be more conveniently maintained in furnaces of the reverberatory type and more particularly reverberatory revolving furnaces in which the flow of the molten charge is effected by gravity. Not only can the desired oxidizing conditions and freedom from contamination by fuel be suitably maintained in revolving furnaces, but the entire process can be more conveniently and economically carried out by reason of the fact that it may be made continuous, with a consequently greater production and complete homogeneity be secured in the resulting product. The rotary kiln commonly used in the manufacture of Portland cement is well adapted to this purpose.

In carrying out my process in the preferred form, the raw materials consisting of a cement forming base and suitable cement forming acid acting elements such as alumina, iron oxide, silica or titanium oxides or a combination of two or more of these may be used. A typical raw material may consist substantially of equal parts of bauxite and limestone or other lime yielding material of average composition which will produce in a typical case a cement containing silica approximately 6%, alumina approximately 41%, iron oxide approximately 11%, lime approximately 41% and undetermined material approximately 1%. The fuel, which may be liquid, gaseous or pulverized, is supplied in such quantities that the temperature of the furnace is maintained sufficiently high to cause complete melting of the raw materials which are discharged in a fluid condition corresponding approximately to that of slag tapped from the blast furnace in iron smelting. As the charge passes through the furnace it is subjected to the action of a sufficient quantity of air to prevent reduction of the iron compounds to a metallic or ferrous state, and as the raw material progresses, it is gradually heated to the melting point and flows from the discharge end of the furnace in a substantially continuous or at least intermittent stream. The molten slag after discharge from the furnace is chilled in any of the convenient and well-known ways common to the smelting art, and the chilled product after pulverization is ready for use as a cement.

It is to be understood that the manner of carrying out my invention is subject to many variations not only in the manner but in the means employed. Not only may various types of furnace be used, but the method of firing and kind of fuel used can also be varied and the manner of discharging and chilling the resulting melt can be widely varied without affecting the essential thought of the invention.

I claim:

1. In the process of making aluminate cement, the steps which comprise melting a charge of aluminous material together with a base in an oxidizing heat and then cooling the resulting slag.

2. In the process of making quick hardening low lime cement, high in cement forming acid acting elements, the steps which comprise melting bauxite and lime yielding material in an oxidizing heat and then chilling the resulting slag.

3. In the process of making quick hardening low lime cement, high in cement forming acid acting elements, the steps which comprise melting in an oxidizing heat a charge of bauxite and lime yielding material in proportions of approximately one molecule of lime to one molecule of the acid acting elements contained in the bauxite and cooling the resulting slag.

4. In the process of making quick hardening low lime cement, high in cement forming acid acting elements, the steps which comprise melting in an oxidizing heat a charge of bauxite and lime yielding material in which the molecular ratio of lime to acid acting elements does not exceed one to one.

5. In the process of making aluminate cement, the steps which comprise melting in an oxidizing heat a charge comprising a base and an acid acting element and cooling the resulting slag.

6. In the process of making aluminate cement the steps which consist in melting a charge of aluminous material and a base in an atmosphere adapted to prevent reduction of the iron present in the charge and then cooling the resulting slag.

7. The process of making aluminate cement which consists in melting under oxidizing conditions a mixture of raw materials having a low lime content and a high content of alumina.

8. The process of making quick hardening low lime high alumina cement which consists in melting under oxidizing conditions a mixture of raw materials having a low content of base and a high content of acid acting elements.

9. A quick hardening high alumina cement of low base content in which substantially all of the iron originally in the charge of raw material is present in the form of higher oxides.

10. A quick hardening high alumina cement of low base content in which none of the iron oxide originally in the charge of raw material is present in a reduced form.

11. A quick hardening high alumina cement of low base content in which all of the iron in the original charge is present in the form of higher oxides.

12. A quick hardening high alumina low lime cement in which none of the iron oxide present in the original charge exists in reduced form.

13. A quick hardening high alumina low lime cement having a high content of acid acting elements in which none of the iron present in the original charge exists in reduced form.

14. A quick hardening low lime aluminate cement in which none of the iron oxide present in the original charge of raw material exists in reduced form.

15. A quick hardening low lime aluminate cement made from bauxite and lime yielding material in which none of the iron originally present in the bauxite exists in reduced form.

16. A quick hardening high alumina cement in which the cement forming base and the acid acting elements are in a ratio not greater than one to one and in which none of the iron present in the original charge exists in reduced form.

17. A quick hardening low lime aluminate cement having a molecular ratio of lime to alumina not exceeding one to one and in which none of the iron present in the original charge exists in reduced form.

18. A quick hardening cement made from bauxite and lime in which the molecular ratio of lime to alumina does not exceed one to one and in which none of the iron originally present in the bauxite exists in reduced form.

19. A high alumina low lime chilled melt adapted to be pulverized for the manufacture of cement and in which there is no ferrous reduction product.

20. A chilled high alumina melt for pulverization in the manufacture of quick hardening cement, said melt having a low base content and characterized by the fact that none of the iron oxides originally in the charge of raw material are present in a reduced form.

21. A chilled melt high in alumina for pulverization in the manufacture of quick hardening low lime cement characterized by the fact that none of the iron oxides originally in the charge of raw material are present in a reduced form.

22. A chilled melt high in alumina for pulverization in the manufacture of quick hardening cement having a low lime content and a high content of acid acting elements, said melt being characterized by the fact that none of the iron oxides originally in the charge of raw material are present in a reduced form.

23. A chilled melt for pulverization in the manufacture of quick hardening low lime aluminate cement, said melt being characterized by the fact that none of the iron oxides originally present in the charge of raw material exist in a reduced form.

24. A chilled melt for pulverization in the manufacture of quick hardening low lime aluminate cement made from bauxite and lime yielding material, said melt being characterized by the fact that none of the iron oxides originally in the charge of raw material are present in a reduced form.

25. A high alumina chilled melt for pulverization in the manufacture of quick hardening cement, said melt being characterized by the fact that the cement forming base and acid acting elements are in a ratio not greater than one to one and in which none of the iron oxides in the original charge exist in reduced form.

26. A chilled melt for pulverization in the manufacture of low lime aluminate cement, said melt being characterized by the fact that the molecular ratio of lime to alumina in combination does not exceed one to one and none of the iron present in the original charge exists in reduced form.

27. A chilled melt for pulverization in the manufacture of quick hardening low lime cement, said melt being made from bauxite and lime yielding material and characterized by the fact that the molecular ratio of lime to alumina in combination does not exceed one to one and by the fact that none of the iron originally present in the bauxite exists in reduced form.

28. A chilled melt for pulverization in the manufacture of quick hardening low lime cement, said melt comprising lime combined with alumina in a monocalsic ratio and in which none of the iron present in the original charge exists in reduced form.

29. In the process of making aluminate cement, the steps which comprise melting in a revolving reverberatory furnace a charge of aluminous material together with a base in an oxidizing heat and then cooling the resulting slag.

30. In the process of making cement in which the base and acid acting elements are present in a monobasic ratio, the steps which comprise melting in a revolving reverberatory furnace a charge of acid acting material together with a base in an oxidizing heat and then cooling the resulting slag.

31. In the process of making quick hardening low lime cements high in cement forming acid acting elements, the steps which comprise melting in a revolving reverberatory furnace a charge of acid acting material together with a cement forming base in an oxidizing heat and then cooling the resulting slag.

32. In the process of making quick hardening low lime cement, high in cement forming acid acting elements, the steps which comprise melting in a revolving reverberatory furnace bauxite and lime yielding material in an oxidizing heat and then chilling the resulting slag.

33. In the process of making quick hardening low lime cement, high in cement forming acid acting elements, the steps which comprise melting in an oxidizing heat in a revolving reverberatory furnace a charge of bauxite and lime in proportions of approximately one molecule of lime to one molecule of the acid acting elements contained in the bauxite and cooling the resulting slag.

34. In the process of making quick hardening low lime cement, high in cement forming acid acting elements, the steps which comprise melting in an oxidizing heat in a revolving reverberatory furnace a charge of bauxite and lime in which the molecular ratio of lime to acid acting elements does not exceed one to one.

35. In the process of making aluminate cement, the steps which comprise melting in an oxidizing heat in a revolving reverberatory furnace a charge comprising a base and an acid acting element and cooling the resulting slag.

36. In the process of making aluminate cement the steps which consist in melting in a revolving reverberatory furnace a charge of aluminous material and a base in an atmosphere adapted to prevent reduction of the iron present in the charge and then cooling the resulting slag.

37. The process of making aluminate cement which consists in heating under oxidizing conditions in a revolving reverberatory furnace raw material having a low lime content and a high content of alumina.

38. The process of making quick hardening low lime cement which consists in heating under oxidizing conditions in a revolving reverberatory furnace raw material having a low content of base and a high content of acid acting elements.

In witness whereof I have signed this specification.

HENRY S. SPACKMAN.